United States Patent [19]

Walter et al.

[11] Patent Number: 4,493,074
[45] Date of Patent: Jan. 8, 1985

[54] CONTENT INDUCED TRANSACTION OVERLAP COMMUNICATION SYSTEM

[75] Inventors: Chris J. Walter, Columbia; Colleen R. Wilson, Westminister; Semyon Berkovich, Rockville, all of Md.

[73] Assignee: The Bendix Corporation, Southfield, Mich.

[21] Appl. No.: 439,012

[22] Filed: Nov. 3, 1982

[51] Int. Cl.³ .............................................. H04J 3/00
[52] U.S. Cl. ..................................................... 370/119
[58] Field of Search ........................... 370/119, 93, 85; 340/825.51

[56] References Cited

U.S. PATENT DOCUMENTS

| | | | |
|---|---|---|---|
| 3,752,921 | 8/1973 | Audretseh, Jr. et al. | 370/85 |
| 4,099,028 | 7/1978 | Towson | 370/93 |
| 4,161,786 | 7/1979 | Hopkins et al. | 364/900 |
| 4,177,357 | 12/1979 | Mayer | 370/85 |
| 4,199,661 | 4/1980 | White et al. | 370/91 |
| 4,199,662 | 4/1980 | Lowe, Jr. | 370/85 |
| 4,199,663 | 4/1980 | Herzog | 370/85 |
| 4,232,294 | 11/1980 | Burke et al. | 340/147 LP |
| 4,292,623 | 9/1981 | Eswaran et al. | 340/147 R |
| 4,337,465 | 6/1982 | Spracklen et al. | 340/825.03 |
| 4,408,325 | 10/1983 | Grover | 370/119 |
| 4,434,421 | 2/1984 | Baker et al. | 370/85 |

OTHER PUBLICATIONS

T. N. Zakharova, V. S. Podlazov & G. G. Stetsyura, "Fast Algorithm for Decentralized Priority Access to a Common Channel", *Automation and Remote Control*, vol. 41, No. 10, Part 2, Oct. 1980, pp. 1463-1469.

Primary Examiner—Douglas W. Olms
Assistant Examiner—Wellington Chin
Attorney, Agent, or Firm—James R. Ignatowski; Russel C. Wells

[57] ABSTRACT

A content induced transaction overlap communication system for transmitting data over a single communication channel between a plurality of senders and at least one receiver. The senders simultaneously transmit the highest order bits of their data word, one bit at a time in serial fashion and monitor the state of the communication channel. Transmission of data bits is terminated by all senders which detect a difference between the state of their transmitted data bit and the state of the communication channel. Bit competition performed at the end of each transmitted data word determines among those senders still having data bits remaining to be transmitted which sender has lexicographically the next smallest word and activates that sender to transmit its remaining data bits. This procedure continues until all of the senders have completed the sending of their data word.

27 Claims, 11 Drawing Figures

| TAG (WORD) NO. | 3-BIT WORD |
|---|---|
| 1 | 100 |
| 2 | 001 |
| 3 | 111 |
| 4 | 000 |
| 5 | 001 |
Fig-3
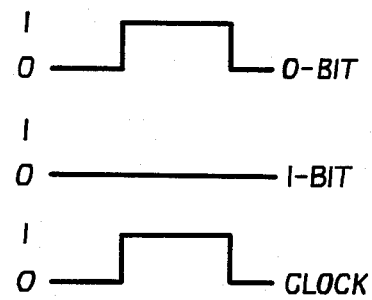
Fig-5
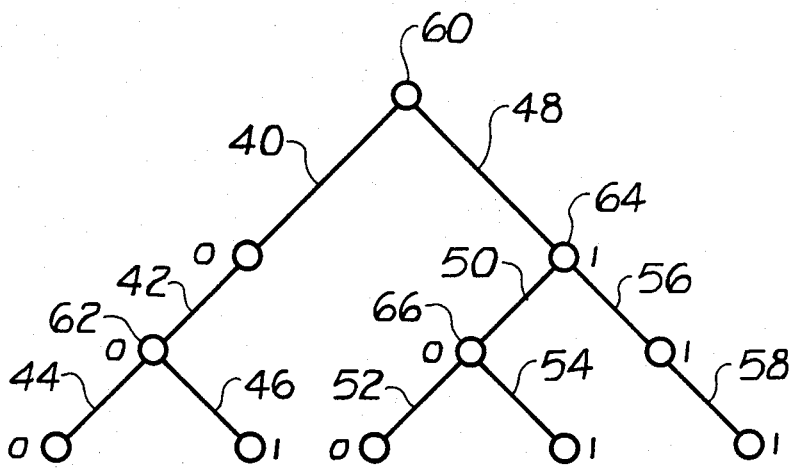
Fig-4
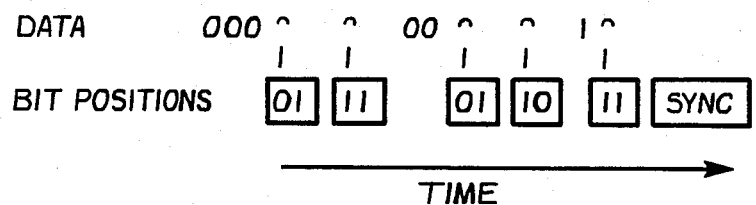
Fig-6

CONTENT INDUCED TRANSACTION OVERLAP COMMUNICATION SYSTEM

BACKGROUND OF THE INVENTION

The invention is related to multi-access channel communication systems and in particular to a content induced transaction overlap multiple access communication system.

Prior Art

Various types of multiple-access channel communication systems are known in the art. These communication systems may conveniently be divided into two distinct types, the Time Division Multiple Access (TDMA) systems, and the Carrier Sensed Multiple Access (CSMA) systems. In Time Division Multiple Access systems, such as disclosed by Hopkins et al in U.S. Pat. No. 4,161,786; Lowe, Jr. in U.S. Pat. No. 4,199,662 or White et al in U.S. Pat. No. 4,199,661 the transmission channel capacity is divided into time slots during which identified transmitters are allowed to transmit their information over the communication network. Each transmitter is assigned a specific time slot so that each transmitter in turn will have an opportunity to transmit its information. In Carrier Sensed Multiple Access systems, such as disclosed by Eswaran et al in U.S. Pat. No. 4,292,623, Herzog in U.S. Pat. No. 4,199,663, or Spracklen et al in U.S. Pat. No. 4,337,465, each transmitter detects when the communication channel is idle, then after a predetermined period of time attempts to transmit its information. Typically, the waiting period depends on of the assigned priority of the transmitter. The priority of each transmitter may be fixed, but preferably as disclosed Burke et al in U.S. Pat. No. 4,232,294 the priorities of the individual transmitters are rotated so that each transmitter, at one time or the other, will have the highest transmission priority. If a collison occurs, i.e. when two different transmitters attempt to transmit simultaneously, the transmitters terminate their transmission and then attempt to transmit on the channel after waiting their respective delay times. If the transmission is successfully initiated, the transmitter sends the information until completion of the message. Hopkins et al in U.S. patent discloses an alternate dual mode communication system incorporating both the Time Division Multiple Access and Carrier Sensed Multiple Access systems.

T. N. Zakharova, V. S. Podlazov and G. G. Stetsyura, in their article "Fast Algorithm for Decentralized Priority Access to a Common Channel" *Automation and Remote Control*, vol. 41, No. 10, Part 2, pp. 1463 to 1469, October 1980, disclose a novel algorithm for resolving channel access contentions. In the disclosed algorithm each transmitter is assigned to priority code, and all the transmitters having information ready to send when the channel becomes idle, defined as a synchropause, constitute a generation. The priority codes are then sent out on the communication channel. The transmitters of each generation are then sorted out by priority and they are allowed access to the channel in the order of decreasing priorities. Using this method, each transmitter of a generation is permitted access to the channel before the generation of the next synchropause and the next generation. This method eliminates simultaneous transmission within each generation and assures that each transmitter within the generation will have an opportunity to transmit its information independent of its priority.

The problem with the Time Division Multiple Access system is that often a particular transmitter may not have any information to transmit during its allotted time slot, while other transmitters may generate two or more messages in the period between their allotted time slots. Therefore some transmission time slots are wasted while other messages are delayed while awaiting access to the common transmission line. This problem is partially overcome by the Carrier Sensed Multiple Access system under light or moderate loads. However under high message traffic conditions, the probability of simultaneous access to the common transmission line rises sharply, and excessive amounts of time are wasted resolving priority differences of the involved transmitters. The present content induced transaction overlap communication system is designed to overcome these problems.

SUMMARY OF THE INVENTION

The invention is a content induced transaction overlap communication system for transmitting data from a plurality of senders to a receiver over a single communication channel. Each sender has a data register storing the multiple bit data word to be transmitted, a word boundary register storing the number of bits in the data word and a bit position register. The transmission begins with each sender transmitting the highest order bit stored in the data register. Bits are transmitted on the channel in an overlapped manner such that the channel state is the logical sum or product of the transmitted bits. Using single phase representation, where a zero bit is transmitted as a finite signal level and a one bit is transmitted as a null signal level, the composite channel states are accordingly 0 or 1.

The senders each then compare the state of the communication channel with their transmitted bit to determine if they are the same. If the state of the communication channel is the same as the transmitted bit, the sender transmits its next highest bit and decrements its word boundary and bit position registers. However, if the state of the communication channel is different from its transmitted bit, the sender terminates the transmission of its remaining bits but continues to monitor the communication channel and decrement its word boundary register for each bit transmitted on the communication channel. At the end of the transmission of the data word, indicated by the word boundary register being decremented to zero, each sender enters into bit competition with all of the senders based on the content of its bit position register when it stopped transmitting to determine if it has lexicographically the next smallest data word. If it has, it initiates the sending of its remaining data bits. However, if it doesn't have lexicographically the next smallest data word, the sender waits until the end of the transmission of the current data word and re-enters the bit competition. This cycle repeats until all of the senders have completed the transmission of all the bits in their data words.

The advantages of the content induced transaction overlap communication system are increased throughput, guaranteed stability, elimination of the transmission of duplicate information, no channel lock-up and fast recovery from overload. These and other advantages will become apparent from a reading of the detailed description of the invention in conjunction with the figures.

BRIEF DESCRIPTION OF THE FIGURES

FIG. 3 is an example of a collection of 3-bit (words) tags.

FIG. 4 is a binary tree representation of the collection of 3-bit (words) tags shown in FIG. 3.

FIG. 5 is a graphical illustration of the 0 bit and 1 bit signals transmit on the communications channel.

FIG. 6 is an example of a message transmitted during content induced transaction overlap communication.

DETAILED DESCRIPTION OF THE INVENTION

Figure 1:
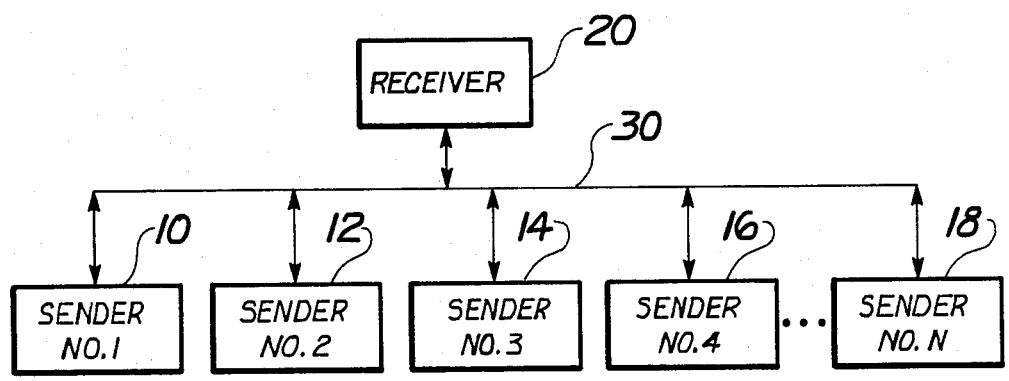
FIG. 1 is a block diagram of a multiple access communications system.

The content induced transaction overlap communication system is intended to solve many of the problems that exist when many transmitters require multiple access to a single communication channel to a common receiver. FIG. 1 is a block diagram of a typical system having multiple Senders 10 through 18 transmitting information to a Receiver 20 over a common communication channel or Bus 30. Each Sender 10 through 18 is capable of randomly sending information which is required by the Receiver 20. The Senders 10 through 18 may represent individual sensors, controls, or other types of inputs, or may be individual microprocessor in a multiple computer system or individual computers in a fault tolerant computer network or any combination of the above. The Receiver may be a utilization device, or master in a multiple computer system, or any other similar device.

Figure 2:
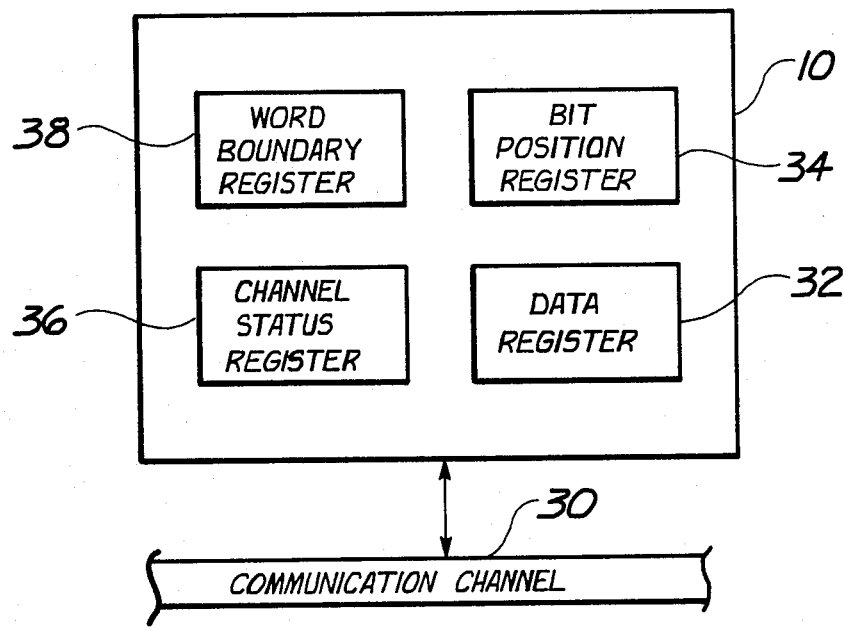
FIG. 2 is a block diagram illustrating the elements of the Sender in a content induced transaction overlap communications system.

Each sender 10 through 18 embodies a Data Register (DR) 32, a Bit Position (BP) Register 34 a Channel Status (CS) Register 36 and a Word Boundary (WB) Register 38 as shown in FIG. 2. The Data Register 32 holds the data word to be transmitted to the communication channel 30. The data word is shifted out of the Data Register 32 to the communication channel 30 one bit at a time in serial fashion. The Bit Position Register 34 is loaded with the number of bits (r) in the data word to be sent after the Sender has synchronized with the channel. It is decremented every time the Sender successfully transmits a data bit. It is also used to determine access privilege to the communication channel. The Channel Status (CS) Register 36 is a one bit register storing the bit value of the last transmission on the communication channel and functions as the receiver portion of the Sender. The Word Boundry (WB) Register 38 keeps track of the number of bits that have been sent over the communication channel and is used to determine when a word has been completely transmitted. Until the word is completely transmitted, the Word Boundry Register 38 signals the Sender to attempt to continue its data transmission.

The content induced transaction overlap communication system is based on multiple match resolution methods developed for associative (content-addressable) memory technology. The problem of multiple match resolution is the selection of items from an associative memory, when more than one item corresponds to the input search criteria. The solution to this problem was given in early studies of associative processing by G. G. Stetsyura "A New Principle for Organization of Computer Memories"—Doklady Akademiya Nauk USSR Vol. 132, No. 6, pp. 1291-1294 and by M. H. Lewin, "Retrieval of Ordered Lists from a Content—Addressed Memory" RCA Review pp. 215-229, June 1962. Assume that the sense lines for each bit pass through all words of memory and the sensed bit can be in one of four possible states. Using bi-phase codes, these line states may be represented by:

"0"-01 all words selected have 0's in this bit position
"1"-10 all words selected have 1's in this bit position
X-11 some words have 0's and some words have 1's in this bit position
and
Z-00 no words were selected FIG. 3 is an example of words in an associative memory with three bit tags. The multiple match algorithm uses the content of these tags to extract the individual words by scanning the three bit portions in succession. Each time an "X" is sensed, a subset of matched words, i.e. words having "0" in this position, can be isolated. The algoritm is independent of the memory size and requires only $2m-1$ read cycles to retrieve m words.

By analogy, in data communications, each Sender can be treated as a word in an associative memory; successive sensings of the bit positions will be serial transmissions. Subsets of Senders can be isolated, in a like manner, through testing the transmission results. Such a multiple access organization called "Decentralized Priority Access" was suggested and developed by G. A. Kotyuzhanski, L. B. Nisnevich and G. G. Stetsyura "Decentralized Priority Control in a Single Channel Data Transmission System" Teknicheskaya Kibernetika No. 2, 1971, by L. B. Nisnevich and G. G. Stetsyura, Decentralized Priority Control in Integral Communication Systems, Automation and Remote Control". Vol. 33, No. 4, pp. 795-798, 1972 and by T. N. Zakharova, V. S. Podlazov and G. G. Stetsyura "Fast Algorithm for Decentralized Priority Access to a Common Channel", Automation and Remote Control, Vol. 41, No. 10, part 2, pp. 1463-1469, October 1980. In these works, this algorithm was used for decentralized control to resolve contention for channel access among Senders of various priorities.

The content induced transaction overlap communication system uses this algorithm in a different way. Instead of resolving channel access priority, the algorithm is applied to the acquisition of data. In the content induced transaction overlap communication system, the collection of data words is transmitted concurrently. The information content of the individual data words is then resolved gradually from the overlapping transactions in the course of the transmission. The transmission is in fact a decentralized preorder traversal of the binary tree representing the data word collection.

This technique achieves desirable improvements in a multiple-access channel communication system in several areas, it improves average throughput and stability while decreasing delays. Additionally this technique has other properties which provide greater flexibility to transmission control. Some of the features of the content induced transaction overlap communication system are dynamic to varying numbers of users, immediate priority for emergency messages, content based data selection, elimination of transmission of duplicate information, no channel lock-up in burst mode, and fast recovery from overload.

To illustrate the inherent redundancy of sequenced data, suppose we have a collection of m r-bit words. This collection requires m times r bits for its sequenced representation. The cardinality of all possible r-bit messages is $2^{mr}$. The same collection of words, in any permutted order, has equal information value for a Receiver uninterested in the time sequence of the data's arrival. This implies that the useful variety of messages is m! times smaller. Therefore the information content (I) of such a collection of words is:

$$I = \log \left[ \frac{2^{mr}}{m!} \right] \tag{1}$$

where the logarithm here and elsewhere in this discussion are base two.

Since we are dealing with collections of distinguishable words, m cannot be greater than $2^r$. Using Stirling's approximation $m! = \sqrt{2\pi m} \, (m/e)^m$ for large values of m. We obtain:

$$I = mr - m \log m = mr[1 - (\log m)/r] \tag{2}$$

Referring to the example shown in FIG. 3, the five three-bits tags may also represent 5 three bit words. Fifteen bits are required to represent these 5 three bit words in some sequence. Any such sequence representation contains redundancy since 5! = 120 different orderings of these words.

To estimate the redundancy of the sequenced data words, consider their binary tree representation illustrated in FIG. 4. The branches of the tree are labeled with 0's and 1's so that the set of paths from the root to the terminal nodes represents the word collection. If order is not considered we will see that the set of branches in the tree's preorder traversal, with a relatively small amount of additional information, can be used to obtain the entire collection of words. In the example of FIG. 4, the tree contains 10 branches, branches 40 through 58 which means that the information content of our collection is approximately 10 bits rather than 15.

The preorder traversal in itself is insufficient, in general, to reconstruct the binary tree representing the collection of words. To make the preorder traversal uniquely decodable, some additional information about the boundaries between the words must be added. The bifurcation points 60 through 64 of the binary tree, for example, may be indicated using the overlapping X state for conjointed branches with 0's and 1's of the preorder traversal. This corresponds to the usage of the "X" state in the above-mentioned algorithm of ordered retrieval from associative memory. Therefore, the "0's" and "1's" representing branches in the preorder traversal are mapped into the overlapped transaction symbols "0", "1" and "X".

The symbol "X" is the result of superposition of "0" and "1" when a node with two incident branches in passed. Nodes with only one incident branch simply correspond to "0" or "1" in this symbol set. It is easy to verify that such an overlapped transaction, when the word length is fixed, is uniquely decodable. Note that the number of symbols in the overlapped transaction (Q) is less than the number of branches in the binary tree.

The number of "X's" (bifurcation points) in the transaction is equal to m−1, where m is the total number of words. This represents a general relationship between the number of nodes with two branches, i.e. the number of "X's", and the number of terminal nodes for an arbitrary binary tree. Thus, the number of branches in the binary tree is Q+(m−1). The number of read cycles required to extract m words from the associative memory is the sum of the number of "X's" and the number of words, i.e. $(2_{m-1})$.

The information content (I) of the collection of m r-bit words is greater than the number of bits in the preorder traversal (Q+m−1). On the other hand, it is less than the total information which can be represented by Q ternary symbols, i.e. Q log 3.

Therefore:

$$Q + (m-1) < I < Q \log 3 \tag{3}$$

The results of simulations performed on random word collections with different r and m parameters have indicated that "Q" is close to the approximation of "I" as given by equation (2). Hereinafter it will be shown that in the content induced transaction overlap communication system, the number of bits "A" required to transmit an m collection of r-bit words is equal to Q binary digits with an overhead of log r bits per word as given by:

$$A = Q + m \log r = mr \left[ 1 - \left( \log \frac{m}{r} \right) / r \right] \tag{4}$$

The factor [1−(log m/r)/r] in equation (4) is less than one when m is greater than r. When this occurs, the content induced transaction overlap communication system provides data compression because the eliminated redundancy offsets the transmission overhead. For example, if we have 64 words of 16 bits each, the overhead factor will be [1−(log 64/16)/16]=0.88. Therefore, for this specific example, data can be transmitted with 12% fewer bits than the product of m r.

The fundamental operation of the content induced transaction overlap communication system is the overlapped sending of the individual data bits following the analogy with multi-match resolution in associative memory discussed above. Three states exist in the content induced transaction overlap communication system during bit transmission. These are:

"0" all Senders are transmitting zero-bits
"1" all Senders are transmitting one-bits
"X" some Senders are transmitting zero-bits and some are transmitting one bits The Receiver does not actually need to distinguish these three states. It can identify "X" with "0" so that if X is received, it is interpreted as "0". Senders can also distinguish "X"'s and "0"'s. This is due to the fact that the Sender knows what it has just transmitted and can recognize its own possible discord with the current channel state. Therefore, the transmission process can be organized using only two state coding i.e., "0's" and "1's".

This is implemented by representing a Sender's information as a certain impulse for the transmission of a zero-bit ("0") and a null level signal for the transmission of a one bit ("1") as illustrated in FIG. 5. This representation results in the channel state "0" or "X" appearing as a finite level signal and a channel state "1" appearing as a null. The number of Senders in this implementation is inconsequential, but the number of distinguishable messages is limited to $2^m$.

When the Sender has transmitted a finite level signal indicative of a zero bit, the communication channel will be in the "0" or "X" state. This Sender can continue transmission. If a Sender has transmitted a null level signal indicative of a one-bit, it must first determine the state of the communication channel before continuing transmission. When the channel state is a one bit, a null signal level, then the transmitted one bit is picked up by the Receiver and the Sender can continue its activity. However, if the channel state is a "0" bit as indicated by a finite level signal, the Receiver does not receive the transmitted null signal and the Sender recognizes the transmitted one-bit is different from the communication channel state. The Sender then knows that in fact the communication channel state is an "X" state with at least one other Sender transmitting a zero-bit. The Sender retains its current bit position and delays further transmissions. This coding organizes the transmission so that the lexicographically smallest words in the transmitting collection are the first received by the Receiver.

The channel states 0, X and 1 carry information. A separator symbol, such a "Z" in a bi-phase implementation is avoided in the single phase implementation of the content induced transaction overlap communication system. Therefore special protocols must be introduced to identify the word collection boundaries.

Consider a content induced transaction overlap channel with n attached Senders. An aribtrary number "m" of the attached Senders have data ready and have multi access to the communication channel. Each Sender is capable of transmitting a single r-bit word. The collection of the r-bit words in the m different senders is called a "data bucket". Other Senders on the communications channel may become ready to transmit during an active "data bucket", however these Senders must wait unil the current data bucket is completely transmitted. The data of the waiting Senders will then become part of the next sequential "data bucket".

FIG. 6 depicts the format of the message transmitted to the Receiver 20, using the example data shown in FIG. 3. The message comprises two types of informaion, bit position and data. The bit position information is used by the Receiver to reconstruct the word upon receipt.

Consider the transmission of a single data bucket. As the data bucket becomes active each Sender's Word Boundary Register 38 and Bit Position Register 34 (FIG. 2) is loaded with the value "r" indicative of the number of bits, in the word to be transmitted. The transmission over the communication channel 30 begins with each of the m Senders simultaneously transmitting their higher order data bit. Those transmitting a "0"-bit, raise the signal level on the communication channel 30 by a finite value. Those transmitting a 1-bit leave the signal value on the communication channel unchanged. Each sender listens to the communication channel during this transmission. If the Sender just transmitted a 0 or 1 and senses that the state of the channel is not the same as its transmitted bit, it will decrements only its Word Boundary Register 38 and does not transmit its next bit. This Sender however continues to listen to the communication channel and decrements it's Word Boundary Register 38 with each bit transmitted by the other Senders.

This procedure is repeated, with Senders dropping out of the transmission as described above, until the first r-bit word is fully transmitted. This word will be lexicographically the smallest. The remaining $m-1$ Senders will recognize the occurrence of a word boundary by their Word Boundary Registers 38 being decremented to zero. Each of the remaining $m-1$ Senders begins transmitting again, but it does not transmit a data bit. The Senders instead transmit the high order bit of their respective Bit Position Register 34. This transmission occurs exactly as described above for data. However, as each Sender listens to the current channel, it shifts this bit value into the Word Boundary Register 38. This bit position transmission continues until all the bits of the Bit Position Register 34 have been transmitted. It is obvious that at the end of this activity, called "bit competition" the value which has been shifted into the Word Boundary Register is lexicographically the smallest value present in any of the Bit Position Registers of the remaining Senders. The Senders still needing to transmit data now compare their Bit Position and Word Boundary Registers. If the two are equal, the Sender immediately begins to transmit the next bit in its data register.

The Senders which win the bit competition are the Senders which have the fewest bits in their data words remaining to be transmitted. There may be only one Sender winning the bit competition but in case of redundancy in the word to be transmitted, it is possible more than one sender can win the bit competition. In terms of the preorder tree transversal, FIG. 4, the bit competition winner is the Sender or Senders which ceased transmission at the last bifurcation point on the tree. The data transmission resumes with the traversal down this branch. The Sender which won the bit competition does not resend the "1" it was sending when it terminated transmission. This is due to the fact that the Receiver 20 already knows the value of this bit. In particular, if the Sender or Senders which win the bit competition have only one more bit to send it does not send this bit since its value must be "1"

Data transmission resumes at the termination of the bit competition. Each Sender, whether sending or not. listens to the communications channel's activity and decrements its word boundary register as each bit is transmitted. When the Word Boundary Register 38 reaches a zero value, the next word boundary has occurred and "bit competition" is repeated.

This interleaving of data transmission and bit competition continues until all Senders have successfully completed transmission of their data words. At this point, all the Bit Position Registers 34 are zeros and no Sender performs in the bit competition. The m Senders recognize the termination of the current "data bucket by the log (r)+1 bits of "silence" and the transmission of the next "data bucket" can begin after an optional synchronization pattern.

Synchronization with the communication channel implies that the Sender is able to distinguish word boundaries and bit competitions. Once the Sender is synchronized in this manner, it may enter into data transmission on the communication channel. If the Senders are to be permitted to dynamically attach and detach themselves, it is necessary that they be able to synchronize themselves when they come on line. As no special synchronization symbol is used, synchronization can only take place by recognition of a unique data pattern, a data pattern which cannot occur during the transmission of a bucket. This unique pattern might be a series of log (r)+1+r bits of "1" appearing on the communication channel at the end of a data bucket. A Sender wishing to achieve synchronization uses this as a cue.

One attractive feature of the content induced transaction overlap communication system for real time applications is the capacity for interruptions of a bucket transmission to expedite "alarm" messages. When an "alarm" is raised, the associated Sender waits for the next bit competition. It then competes with a Bit Position Register 34 having a value of zero which, of course, wins the competition. the Receiver 20 and other Senders recognize this as a special case and expect the Sender which raised the "alarm" to transmit a full r-bit word, which it does. At the end of alarm Sender's transmission, the normal bit competition resumes and the interrupted transmission take up where it left off.

The functions of the algorithm for the content induced transaction overlap communication systems are preferably implemented by a programmed microprocessor having adequate storage and computation capabilities, such as the 8080A Microprocessor manufactured by Intel Corporation of Santa Clara, Calif. or any other microcomputer or comparable capabilities. However, if desired the algorithm may be hardware implemented using commercially available integrated circuits and discrete electronic components.

The details of the algorithm used in the communication system are presented below in the form of Pseudo Code programs listings. Pseudo Code is used for the program listings since it is not intended to dedicate the invention to a particular microprocessor or type of microprocessor and Pseudo Code listings are universally applicable to different types of computers and computer languages. Therefore a programmer having ordinary skill in the art would be able to translate the presented Pseudo Code program listings into actual program listings for a particular computer. Additionally a person skilled in the electronic circuit art would be able to translate the presented Pseudo Code program into a hardware implementation using commercially available integrated circuits and discrete components.

Figure 7:
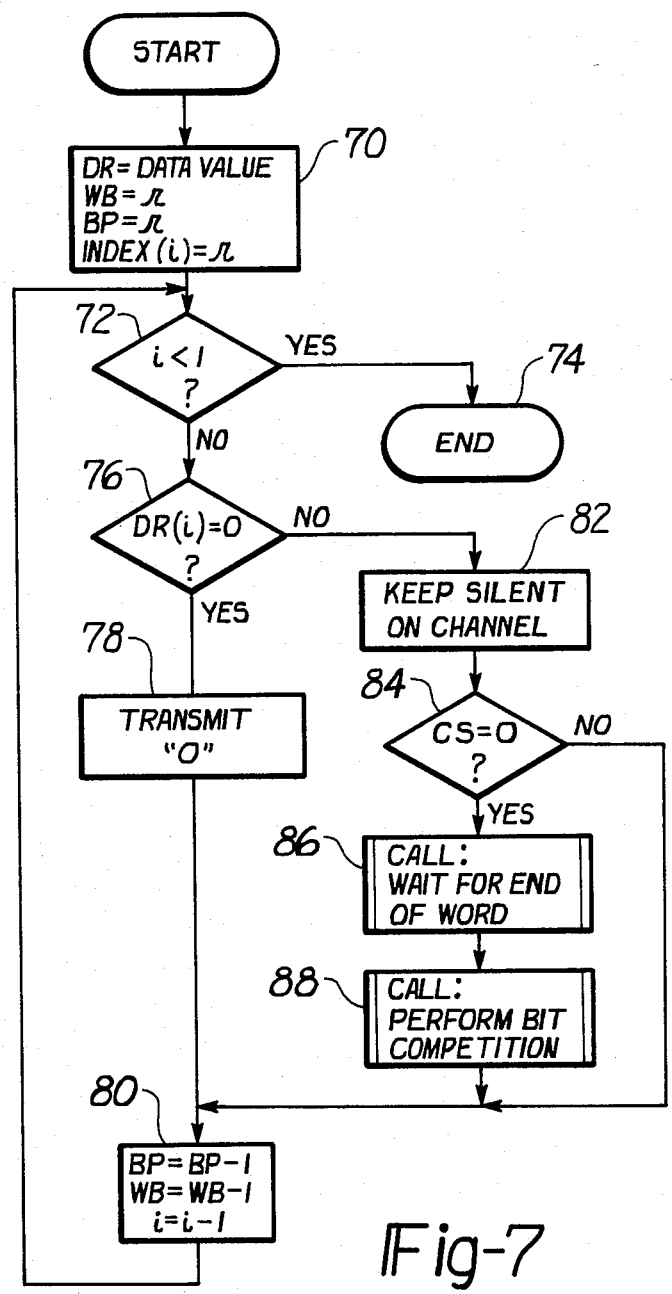
FIG. 7 is a flow diagram for the operation of the Sender.

The Pseudo Code program for the Senders 10 through 18 is given in Table I and the corresponding flow diagram is presented in FIG. 7.

TABLE I

Sender;
Begin
Wait for synchronization;
DR: = data value;
WB: = r;
BP: = r;
For i: r to 1 do
Begin
If DR[i]= 0
Then
transmit on channel;
Else
Begin
keep silent on channel;
If CS = 0
Then
wait for end of word;
perform bit competition;
End;
SBPR: = SBPR-1;

TABLE I-continued

WB: = WB-1;
End;

Referring to the flow diagram shown on FIG. 7, the Sender procedure begins with initializing the Data Register 32, the Bit Position Register 34, Word Boundary Register 38 and an index register as shown in block 70. The index register is a pointer pointing to the data bits in the Data Register to be transmitted. The first decision block 72, inquires if the index "i" is less than one indicating there are no more bits remaining to be transmitted. If "i" is 0 then all the data has been transmitted and the procedure ends for that Sender as indicated by procedure termination block 74.

However if "i" is not equal to zero the program proceeds to inquire, block 76, if the data bit to be transmitted, DR(i), is a logical 0. If so the logical zero data bit is transmitted as indicated by block 78 and the Bit Position Register 34, Word Boundary Registers 38 and the index register are decremented and the procedure indexes to the next highest bit in the Data Register 32.

If the data bit analyzed in block 76 is a logical 1, the Sender keeps silent on the channel as indicated by block 82 and does not transmit the logical 1 data bit, since the transmission of a 1 bit is a null signal on the channel. The procedure then checks the Channel Status (CS) to determine, if another Sender transmitted a zero bit as indicated by decision block 84. If another Sender has transmitted a zero bit, the procure calls the "Wait-for-end of Word" and Perform Bit Competition subroutines, indicated by blocks 86 and 88 respectively. If the Sender wins the bit competition indicated by block 88, it then decrements its Bit Position Register 34 and Word Boundary Register 38 and proceeds to transmit the next bit in its Data Register 32.

Figure 8:
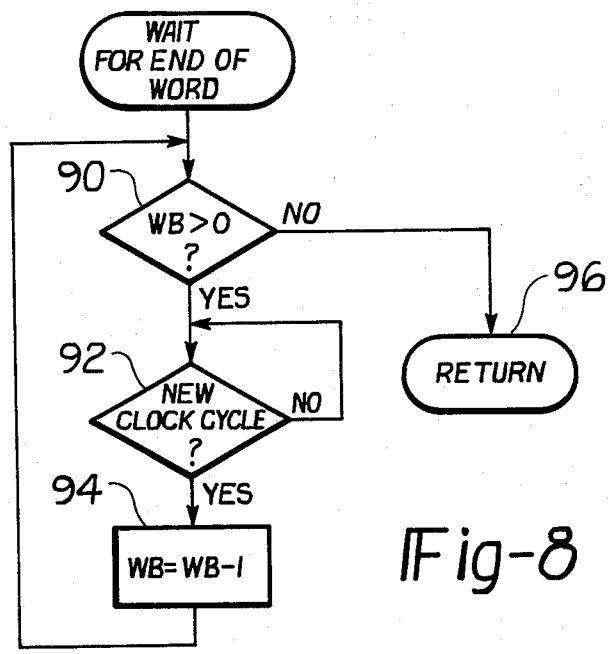
FIG. 8 is a flow diagram for the subroutine "Wait for the end of Word".
Figure 9:
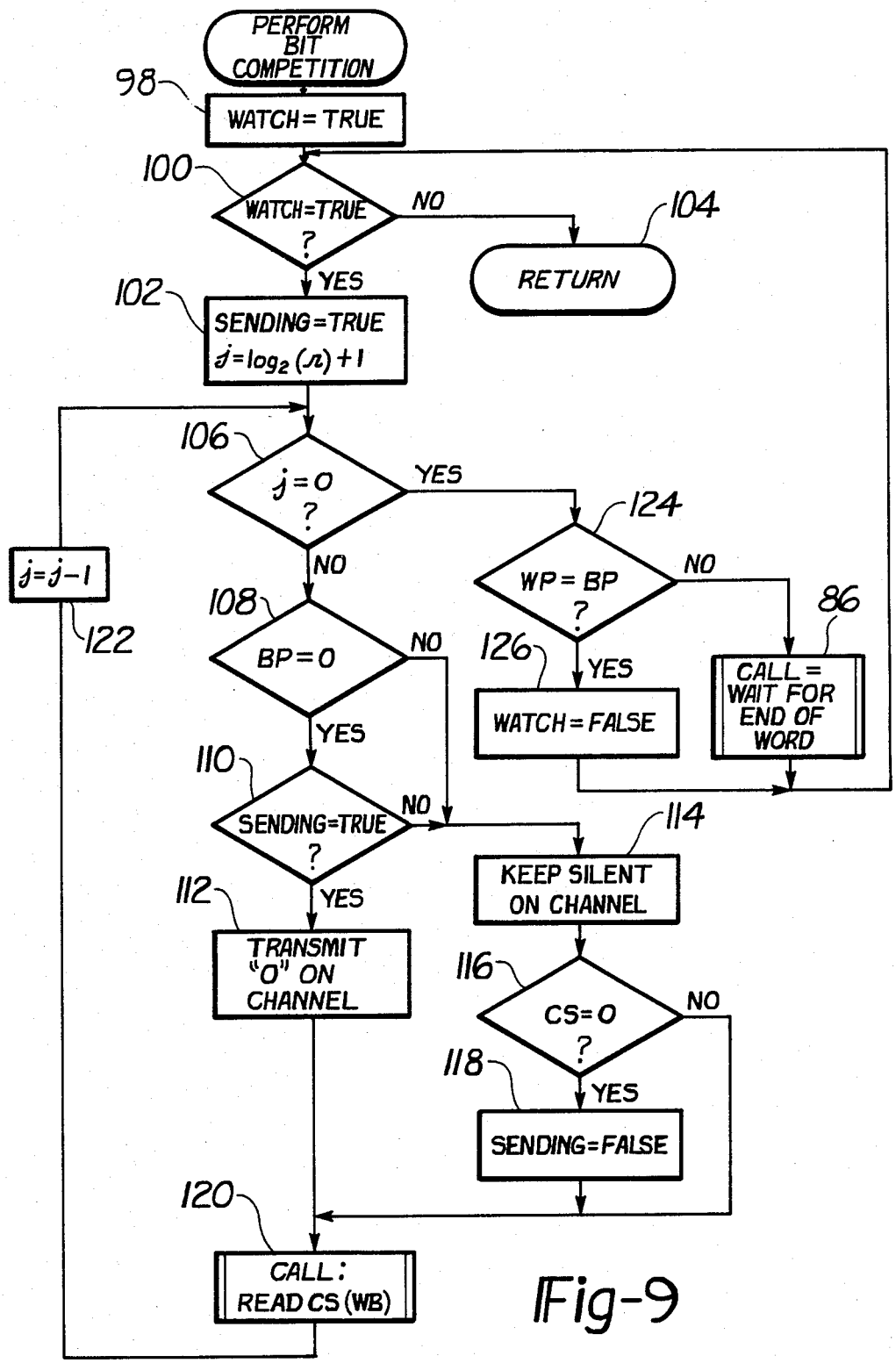
FIG. 9 is a flow diagram for the subroutine "Perform Bit Competition".

The subroutines "Wait for End of Word" and "Perform Bit Competition called out in the Senders program are given on Tables II and III and their respective flow diagrams are presented in FIGS. 8 and 9. Table II and its correspond flow diagram, FIG. 8, give the details of the subroutine "Wait for End of Word" which is performed by each Sender after it detects the state of its transmitted data bit disagrees with the state of channel.

TABLE II

Wait for end of word;
Begin
Do while (WB>0)
If new bit sent
Then
WB: = WB — 1;
End do;
End;

Referring to the flow diagram shown on FIG. 8, the subroutine "Wait for End of Word" begins by inquiring if the content of its Word Boundary Register 38 is greater than zero as indicated by decision block 90. If it is, it then waits for the next clock cycle, decision block 92, then decrements only the Word Boundary Register 38. When the Word Boundary Register 38 is decremented to 0, the subroutine is returned to Sender procedure shown in FIG. 7 as indicated by its procedure termination block 96.

Table III and its corresponding flow diagram, FIG. 9, gives the details of the subroutine "Perform Bit Competition" which is performed by all the Senders which have not completed the transmission of their data word. This Subroutine is performed after the Sender having final access to the communication channel has completed sending its entire data word and follows the completion of the subroutine "Wait for End of Word."

TABLE III

Perform Bit Competition;
watch, sending: Boolean;
Begin
watch: = true;
Do while (watch)
Sending: = true;
For j: = log 2 (r)+1 to 1 do
Begin
If BP[j] = 0
Then
If sending Then transmit on channel;
Else
keep silent on channel;
If CS = 0
Then
sending: = false;
Read CS (WB);
End do;
If WB = BP
Then
watch: = false;
Else
wait for end of word;
End do;

The subroutine "Perform Bit Competition" shown on FIG. 9 begins with setting a Watch Flag to "true" as indicated by Block 98. The subroutine then inquires if the Watch Flag is "true" and the pointer j to a predetermined number, $\log_2(r)+1$ as indicated by decision block 100. If the Watch Flag is "true" the subroutine sets a Sending Flag to "true" as indicated by block 102. If the Watch Flag is "false" the subroutine is terminated as indicated by procedure termination block 104 and returns to the Sending Procedure given on FIG. 7. After the Sending Flag is set to "true", the subroutine inquires, decision block 106, if all the bits in the Bit Position Register 34 have been transmitted i.e. j=0. If not the subroutine inquires, decision block 108, if the bit in the Bit Position Register is a logical 0 bit and if the Sending Flag is true as indicated by decision block 110. If both inquires are true, the subroutine then transmits the 0 bit on the communication channel as indicated by block 112.

If either the bit in the Bit Position Register 32 is not a logical 0 or the Sending Flag is false, the subroutine keeps silent on the channel as indicated by block 114. The subroutine then inquires, decision block 116 if the state of the Channel Status Register 36 is a logical 0. If it is, the Sending Flag is set to false as indicated by block 118, otherwise the subroutine proceeds directly to call the subroutine Read CS (WB), block 120 which records the channel state directly into the Word Boundary Register 38. The subroutine then decrements the Word Boundary Register pointer (j=j−1) as indicated by block 122 and repeats the routine with the next bit in the Bit Position Register 34. When the final bit has been read from the Bit Position Register indicated by j=0 in decision block 106, the subroutine compares, the content of the Word Boundary Register 38 with the content of the Bit Position Register 34 as indicated by decision block 124. If they are equal, the Watch Flag is set to "false", as indicated by block 126, and the subroutine is terminated as previously described. Otherwise the subroutine recalls the subroutine "Wait for End of Word" as indicated by block 86.

The setting of the Watch Flag to false in response to the content of the Word Boundary Register 38 being the same as the content of the Bit Position Register 34 signifies that the remaining bits in the Senders Data Register 32 is lexicographically the smallest remaining to be transmitted and that transmission of these remaining bits can proceed.

Figure 10:
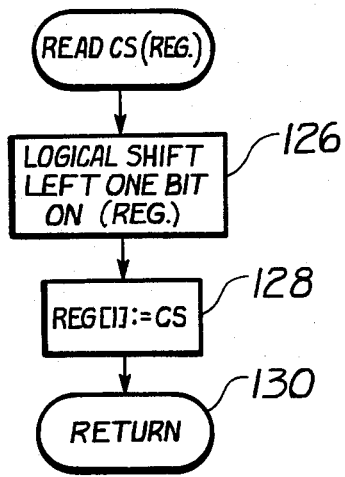
FIG. 10 is a flow diagram for the subroutine "Read Channel Status into Word Boundary Register".

Table IV and its corresponding flow diagram, FIG. 10, gives the details of the subroutine "Read Channel Status into Word Boundary Register" (READ CS (WB)) performed during the "Perform Bit Competition" subroutine.

TABLE IV

Reads CS into Word Boundary Register
Begin
shift left logical one bit (reg);
reg [1]: = CS;
End;
End;

The subroutine "Read Channel Status into Word Boundary Register" as shown on FIG. 10 begins by shifting the bits in the Word Boundary Register by one bit as indicated by block 126 then reading the state of the channel into the first bit position as indicated by block 128. The subroutine then returns to the Perform Bit Competition subroutine of FIG. 10 as indicated by procedure termination block 130.

Figure 11:
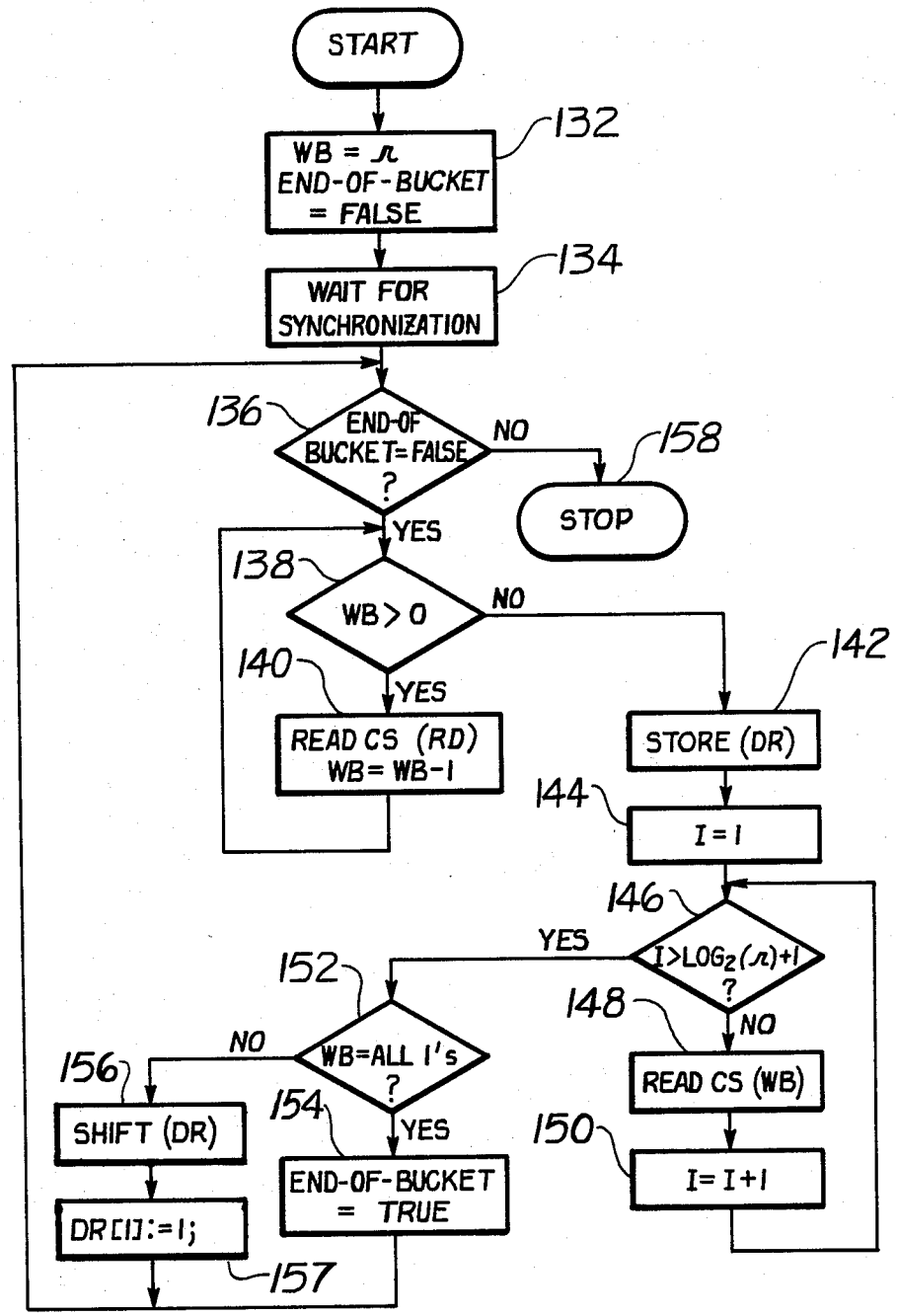
FIG. 11 is a flow diagram for the operation of the Receiver.

The Pseudo Code program for the Receiver 20 is given on Table V and the corresponding flow diagram is given in FIG. 11.

TABLE V

Receiver;
DR: r bit register;
WB: log 2 (r)+1 bit register;
CS: 1 bit register;
end-of-bucket: Boolean;
Begin
end-of-bucket: = false;
WB: = r;
wait for synchronization;
Do until (end-of-bucket);
While (WB>0) do
Begin
Read CS (DR);
WB: = WB − 1;
end;
store (DR);
For i: = 1 to log 2 (r)+1 do
Read CS (WB);
If WB = (all ones)
Then
end-of-bucket: = true;
Else
shift right logical WB bits (DR);
shift left 1 bit (DR)
DR[1]: = 1;
End do;
End;

The Receiver procedure begins by initializing a Receiver Word Boundary Register and setting an End-of Bucket Flag to "false" as indicated in block 132. The Receiver then waits for synchronization as indicated by block 134. The synchronization signal is a series of all 1s. This is the null transmitted by the Senders during the Bit Competition subroutine after the last data bit in the current bucket has been sent. The procedure then inquires, decision block 136, if the End-of-Bucket Flag is false. If it is, the program proceeds to inquire, decision block 138, if the Receiver's Word Boundary Register is empty. If the Receiver's Word Boundary Register is not empty, the channel status is read into the Receiver's Data Register and the Receiver's Word Boundary Register is decremented as indicated by block 140. The program then proceeds to repeatedly analyze the content of the Receiver's Word Boundary Register and store the channel state in the Receiver's Data Register until the Receiver's Word Boundary Register is decremented to zero indicating the entire data word has been received. The Receiver then stores the data word read into the Receiver's Data Register as indicated by block 142. The receiver then monitors the bit competition performed by the Senders by first setting the pointer "I" in the Receiver's Word Boundary Register to 1 as indicated by block 142. It then inquires, decision block 146, if the bit competition is completed, i.e. $I > \log_2(r) + 1$. If the bit competition is still going on the Receiver reads the channel status into the Receiver's Word Boundary Register and increments "I" as indicated by blocks 148 and 150, respectively. When the bit competition is completed, indicated by $I > \log_2(r) + 1$ in decision block 146, the Receiver then inquires, block 152, if the content of the Receivers's Word Boundary Register are all 1's indicating the End of the Bucket. If this is so, the End-of-Bucket Flag is set to "true" and the procedure stops as indicated by procedure termination block 158. Otherwise the content of the Receiver's Data Register is shift right a number of bits corresponding to the number stored in the Receiver's Word Boundary Register, as indicated by block 156. The data is then shifted left one bit and the low order bit in the register is set to one as indicated by block 157. The procedure then returns to record the next data bit sequence transmitted by the Senders as previously discussed. This procedure is repeated until all of the Senders have completed sending their data words and the End-of-Bucket code is detected in decision block 152.

It is not intended that the invention be limited to the hardware arrangement, or operational procedures shown disclosed herein. It is believed that those skilled in the art could use coding techniques or modify the procedures set forth in the Pseudo Code listings and shown on the flow diagrams without departing from the spirit of the invention as described herein and set forth in the appended claims.

What is claimed is:

1. A method for transmitting data from a plurality of senders to a receiver over a single communication channel characterized by the steps of:
   storing in a data register in each sender a multibit data word indicative of the data to be transmitted to the receiver, each bit having one of two possible states;
   storing in a word boundary register in each sender the number of bits in said data word;
   storing in a bit position register in each sender the number of bits in said data word;
   transmitting the highest order data bit in said data register to said communication channel;
   detecting the state of the communication channel by each Sender to determine when the state of the communication channel is the same as the state of the transmitted data bit;
   transmitting the next highest data bit when the state of the channel is the same as the state of the transmitted data bit;
   decrementing said word boundary register and bit position register for each transmitted data bit whose state was the same as the state of communication channel;
   terminating the transmission of the remaining data bits by each sender whose transmitted data bit is different from the state of the communication channel;
   waiting by each sender which has terminated the transmission of its remaining data bits until the transmission of the data word currently being transmitted is completed;
   perform bit competition in response to the end of the transmitted data word to determine if the content of the senders bit position register is lexicographically indicative of the next smallest data word;
   transmitting the remaining data bits to the communication channel when said bit competition affirms that its data word is indicative of the next lexicographically smallest data word; and
   repeating said steps of detecting the state of the channel, transmitting the next highest data bit, terminating transmission, waiting by each sender, and performing bit competition until all of the senders have completed the sending of its stored data word.

2. The method of claim 1 wherein said two possible states of the data word's bits are 0's and 1's, said step of transmitting the highest order data bit transmits said 0 bits as a finite value and said 1 bit as a null.

3. The method of claim 2 wherein said step of waiting comprises the steps of:
   checking by each waiting sender the content of its word boundary register at the end of each transmission on the communication channel to determine if the word boundary register has been decremented to zero;
   decrementing its word boundary register for each transmitted data bit when the content of its word boundary register is not zero; and
   signifying transmission of a data word has been completed when the content of the word boundary register is zero.

4. The method of claims 1 or 3 wherein said step of performing bit competition comprises the steps of:
   setting to "true" a watch flag in each sender whose transmission was terminated prior to sending all of its data bits;
   setting to "true" a sending flag in each sender whose transmission was terminated prior to sending all of its data bits;
   testing the highest order bit position bit in the bit position register to determine its state;
   transmitting said highest order bit position bit on the communication channel when said sending flag is "true" and said tested bit position bit has a first state;
   testing the state of the channel in response to said tested bit position bit having a second state to determine if the channel is also in the second state;
   setting said sending flag to "false" when said channel state is different from said tested bit position bit's state;
   reading the state of the communication channel into the word boundary register;
   indexing to the next lower order bit position bit in the bit position register and repeating the above steps until the bit position register is exhausted;

comparing the content of the word boundary register with the content of the bit position register to set said watch flag to "false" when the content of said bit position and word boundary registers are the same signifying that the word stored in its data register is lexicographically the next smallest word; and repeating said step of waiting when the content of the word boundary and bit position registers are different.

5. The method of claim 4 wherein the collection of data words being transmitted by the plurality of senders is called a data bucket, and wherein said step of bit competition transmits a predetermined bit pattern after transmitting the last data word in said data bucket, the operation of the receiver is characterized by the steps of:

storing in a receiver word boundary register a number indicative of data bits in each of the multi-bit data words;

setting an end-of-bucket flag to false;

recording each received data bit in a receiver data register;

decrementing said receiver word boundary register in response to each received data bit;

detecting when said word boundary register is empty to store the data bits recorded in the data register;

recoding the next sequentially received bits corresponding to bit position data into said word boundary register;

counting the received bit position data bits stored in said word boundary register to determine when said step of bit competition is completed;

testing the content of the word boundary register for a predetermined bit pattern to set the end-of-bucket flag to "true" signifying the data from all the senders has been received in response to said predetermine bit pattern;

shifting the data in said data register the number of bits identified by the bit position data currently stored in the receiver's word boundary register in response to content of the receiver's word boundary register not having said predetermined bit pattern;

shifting the data in the data register one bit in the opposite direction and setting the low order bit to a logical 1;

repeating the above steps until said step of testing the content of the receiver's word boundary register detects said predetermined bit pattern; and terminating said procedure in response to said end-of-bucket flag being set to "true."

6. The method of claim 5 wherein said predetermined bit pattern is a series of 1 bits signifying all of the senders have sent their data words.

7. A data communication system having a single data communication channel interconnecting a plurality of senders to at least one receiver, wherein each sender comprises:

data register means for storing a multi-bit data word; each data bit of said multi-bit data word having one of two possible states;

word boundary register means for storing a number corresponding to the number of data bits in said multi-bit data word;

bit position register means for storing a number corresponding to the number of bits in said multi-bit data word;

first means for transmitting the data bits from said data register to the communication channel one bit at a time in serial fashion;

means responsive to the communication channel assuming the same state as the transmitted data bit for enabling said first means for transmitting to transmit the next data bit, said first means further including means for decrementing said word boundary register and said bit position register to signify the state of the transmitted data bit; was the same as the state of the communication channel;

means for disabling said first means for transmission in response to detecting a difference between the state of the transmitted bit and the state of the communication channel, said means for disabling further including means for only decrementing said word boundary register for each bit transmitted on the communication channel; and bit competition means responsive to the word boundary register being decremented to zero for comparing the contents of its bit position register with the contents of the bit position registers in the other senders to enable said first means for transmitting when the content of its bit position register is indicative of the lexicographically smallest data word remaining to be transmitted.

8. The data communication system of claim 7 wherein said means for enabling comprises:

means for comparing the state of the data bit to be transmitted with a predetermined state to determine if the data bit to be transmitted is the same as said predetermined state; and means responsive to the state of the data bit to be transmitted and the state of the communication channel being different from said predetermined state to enable said first means for transmitting to transmit said next data bit.

9. The data communication system of claim 8 wherein said two possible states are logical states 0 and 1, and wherein said predetermined state is a 0.

10. The data communication system of claim 9 wherein said first means for transmitting transmits said logical 0 state as a finite value and said logical 1 state as a null.

11. The data communication system of claims 7 or 10 wherein said bit competition means comprises:

means for setting a watch flag to "true" in response said means for transmitting being disabled;

means for setting a sending flag to "true" in response to detecting the word boundary register being decremented to zero;

second means for transmitting the content of said bit position register to said communication channel, one bit at a time in serial fashion;

means responsive to the communication channel assuming the same state as the state of the transmitted bit position bit and said sending flag being "true" for enabling said second means for transmitting to transmit the bit position bit on the communication channel;

means for recording the state of the communication channel in said word boundary register for each transmitted bit;

means for setting said sending flag to "false," disabling said second means for transmitting in response to detecting a difference between the state of the transmitted bit position bit and the state of the communication channel;

comparator means responsive to the transmission of all of the bit position bits for comparing the content of the word boundary register with the content of the bit position register to set the watch flag to "false" when they are equal, the setting of said watch flag to "false" enabling said first means for transmitting to resume transmission of the data bits from the data register.

12. The data communication system of claim 7 wherein the collection of data words being transmitted by said plurality of senders is called a data bucket, and wherein said bit competition means transmits a predetermined bit pattern after the last data word in said data bucket is transmitted, said receive comprises:

means for recording said data bits in responses to the state of said communication channel; and means for reconstructing the data words transmitted by the senders in response to state of said communication channel during said bit competition.

13. The data communication system of claim 12 wherein said means for recording comprises:

a receiver word boundary register storing a number indicative of number of bits in said data words to be received;

a means for recording in a receiver data register the state of each bit transmitted on said communication channel;

means for decrementing said receiver word boundary register in response to recording each of said data bits in said receiver data register;

means for detecting when said receiver word boundary register is decremented to zero to store the data bits recorded into said receiver data register as a data word.

14. The data communication system of claim 13 wherein said means for reconstructing said data words comprises:

a counter for counting the number of bit position bits transmitted on the communication channel;

means for resetting said counter in response to said receiver word boundary register being decremented to zero;

means for recording in said receiver word boundary register the state of said communication channel for each transmitted bit position bit;

means for incrementing said counter for each recorded bit position bit;

means for comparing the content of said receiver word boundary register with a predetermined code to detect the end of the transmission of all of the data words in the data bucket;

means for shifting the data in the receiver data register a number of bits equal to the number stored in the receiver word boundary register in response to the content of the receiver word boundary register not being said predetermined code;

means for shifting the data in the word boundary register back one bit and setting the low order bit to a logical "1"; and means for signifying all the data words in data bucket have been received in response to the content of the receiver word boundary register being the same as said predetermined code.

15. The communication system of claim 14 wherein said predetermined code is all 1's.

16. A method for transmitting data from a plurality of senders to a receiver over a single communication channel characterized by the steps of:

storing in a data register in each sender, a multi-bit word to be transmitted; each bit having one of two possible states;

simultaneously transmitting on the communication channel by said sender the highest order data bit stored in said data register, one bit at a time in a serial sequence when the state of the transmitted bit is the same as the state of the communication channel;

terminating the transmission of data bits by each sender which transmits a data bit having a state different from the state of the communication channel;

serially transmitting bit position bits by each sender whose transmission of data bits has been terminated in response to detecting the transmission of a complete data word to determine lexicographically the next smallest word remaining to be transmitted, said transmitted bit position bits corresponding to the number of data bits remaining to be transmitted by that sender;

transmitting the remaining data bits by the sender determined to have the next smallest word;

repeating said steps of serially transmitting bit position bits and transmitting the remaining data bits until the data words in all of the senders have been transmitted;

alternately recording said sequences of data bits and bit position bits in the receiver to reconstruct the data words transmitted by all the senders.

17. The method of claim 16 wherein said step of serially transmitting comprises the steps of:

storing in a sender word boundary register and a sender bit position register a digital number equal to the number of data bits in the data word;

checking the state of the data bit to be transmitted to determine if it has a predetermined state;

transmitting said data bit to said communication channel when the data bit has said predetermined state;

decrementing the content of said sender word boundary register and said bit position register to signify that the data bit has been transmitted;

checking the state of the communication channel in response to said data bit not having said predetermined state to determine if the channel state is said predetermined state; and decrementing said sender word boundary register and said senders bit position register in response to said channel state being different from said predetermined state.

18. The method of claim 17 wherein said step of terminating the transmission of said data bits comprises the steps of:

not transmitting said next data bit in response to detecting that state of said data bit is not said predetermined state and the state of said communication channel is said predetermined state; and decrementing said word boundary register for each bit transmitted on the communication channel by at least one other sender to determine when said at least one other sender has completed the transmission of its data word.

19. The method of claim 18 wherein said two possible states are a logical 1 and a logical 0 said predetermined state is a logical 0.

20. The method of claim 19 wherein said step of transmitting said data bit transmits a logical 0 state as a finite value and said logical 1 state as a null.

21. The method of claim 18 wherein said step of transmitting bit position bits comprises the steps of:
setting a watch flag and a sending flat to "true" and a predetermined value in a counter in response to said sender's word boundary register being decremented to zero;
testing the state of the highest bit position bit stored in the sender's bit position register to determine if it has said predetermined state and if said sending flag is "true";
transmitting said bit position bit when said bit has said predetermined state and said sending flag is "true";
testing the state of said communication channel when the state of said bit position bit is not said predetermined state or said sending flag is "false" to set said sending flag to "false" when the state of the communication channel is the same as said predetermined state;
recording the state of the communication channel in said sender's word boundary register and decrementing said counter to start the analysis of the next sequential bit position bit;
detecting when the counter has been decremented to zero to compare the content of said sender's word boundary register with the content of the bit position register;
setting said watch flag to "false" in response to the content of the senders word boundary register being the same as the content of the sender's bit position register terminating the bit competition and enabling the sender to begin transmitting the remainder of its data bits; and
waiting for the completion of the transmission of the next data word when the content of the sender's word boundary register differs from the content of the sender's bit position register.

22. The method of claim 21 wherein said two possible states are a logical 1 and a logical 0, and said predetermined state is a logical 0.

23. The method of claim 22 wherein said steps of transmitting transmit said logical 0 state as a finite signal and said logical 1 state as a null.

24. The method of claim 21 where the collection of data words being transmitted by said plurality of senders is called a data bucket; and wherein senders transmit a predetermined bit pattern after the last data word in the data bucket is transmitted; said step of alternately recording comprises the steps of:

recording said data bits in a receiver data register in response to the state of the communication channel; and
reconstructing the data words transmitted by the senders in response to the state of the channel during the transmission of said bit position bits.

25. The method of claim 24 wherein said step of recording said data bits into said receiver data register comprises the steps of:
storing a number indicative of the number of data bits in said data words in a receiver word boundary register;
serially storing in said receiver data register the state of each data bit transmitted on the communication channel;
decrementing said receiver word boundary register in response to recording each of said data bits in said receiver data register;
detecting when the receiver word boundary register is decremented to zero to store the data word stored in the receiver data register.

26. The method of claim 25 wherein said step of reconstructing the data words comprises the steps of:
resetting a bit position counter to 1 in response to said receiver word boundary register being decremented to zero;
recording in said receiver word boundary register the state of the communication channel for each bit position bit transmitted on the communication channel;
incrementing said counter for each recorded bit position bit;
comparing the content of said receiver word boundary register with a predetermined code to detect the end of the transmission of all of data words in the data bucket;
shifting the data in said receiver data register a number of bits equal to the number stored in the receiver word boundary register in response to the content of the receiver word boundary register not being said predetermined code;
shifting the data in the receiver data register back one bit and setting the low order bit to a logical 1; and
signifying all the data words in the data bucket have been received in response to the content of the receiver word boundary register being the same as said predetermined code.

27. The method of claim 26 wherein said predetermined code is when the content of said receiver word boundary register are all logical 1's.

* * * * *